PATTERN

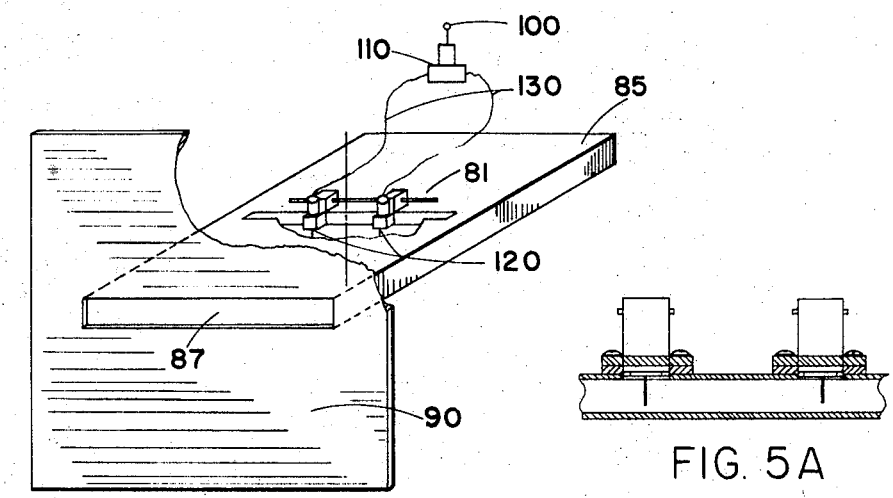
FIG. 5
FIG. 5A
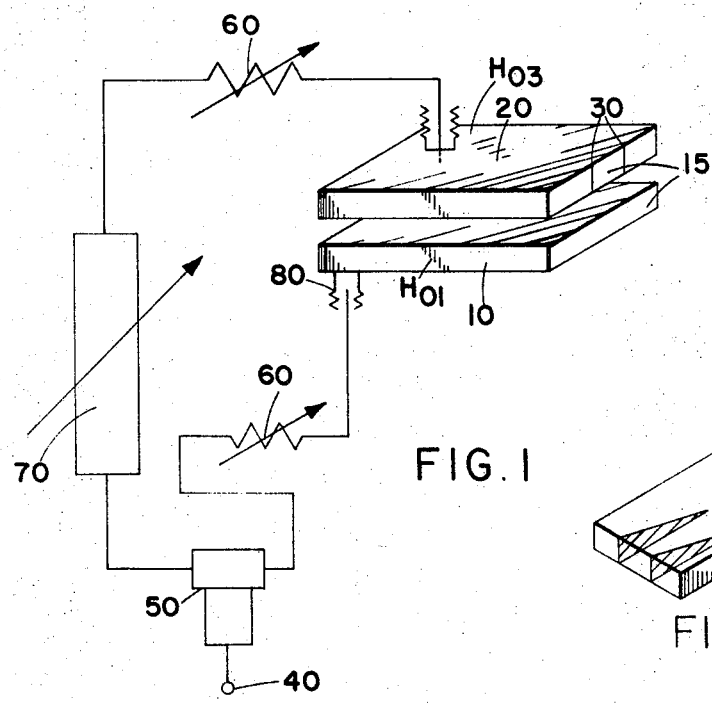
FIG. 1
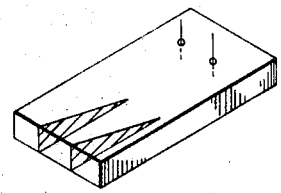
FIG. 1A
INVENTOR
CARLTON H. WALTER
ANTHONY G. JENNETTI
BY *Cennamo, Dunbar & Kremblas*
ATTORNEY

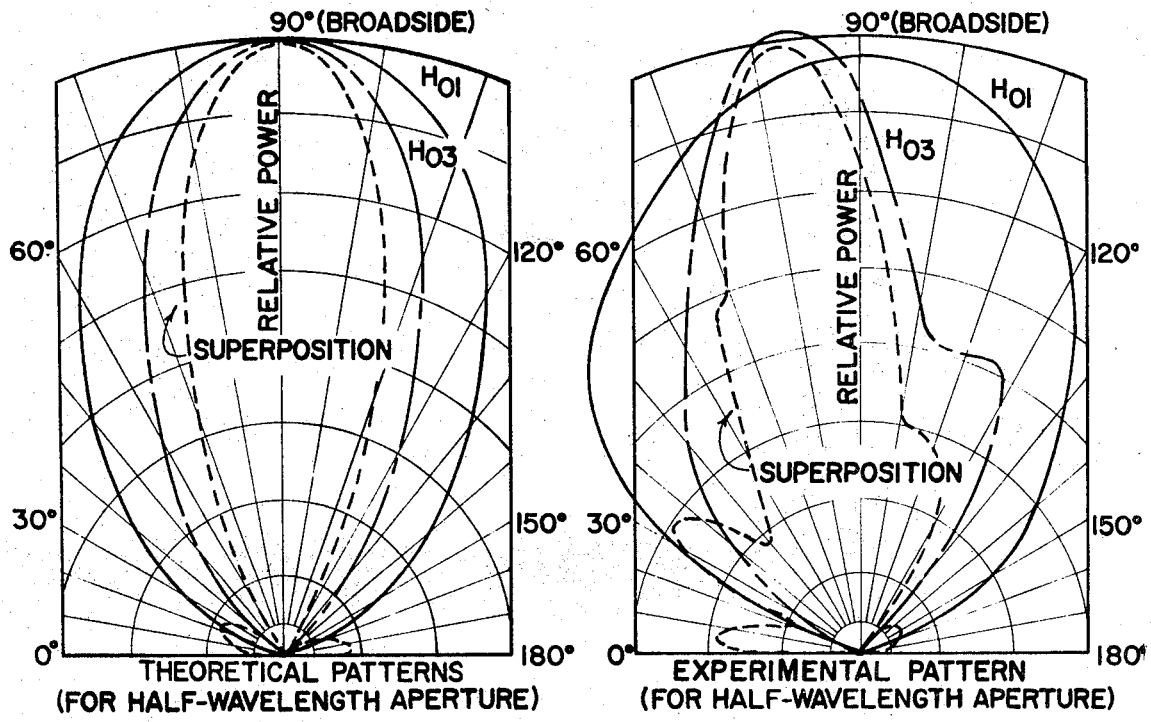
FIG. 2a — THEORETICAL PATTERNS (FOR HALF-WAVELENGTH APERTURE)
FIG. 2b — EXPERIMENTAL PATTERN (FOR HALF-WAVELENGTH APERTURE)
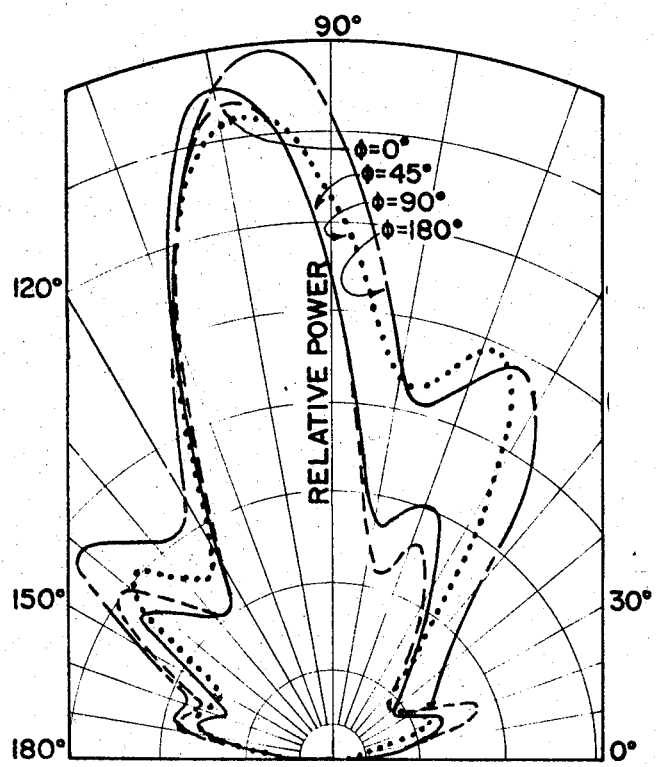
FIG. 3
INVENTOR.
CARLTON H. WALTER
ANTHONY G. JENNETTI
BY
ATTORNEY

APERTURE DISTRIBUTION

PATTERN

APERTURE DISTRIBUTION

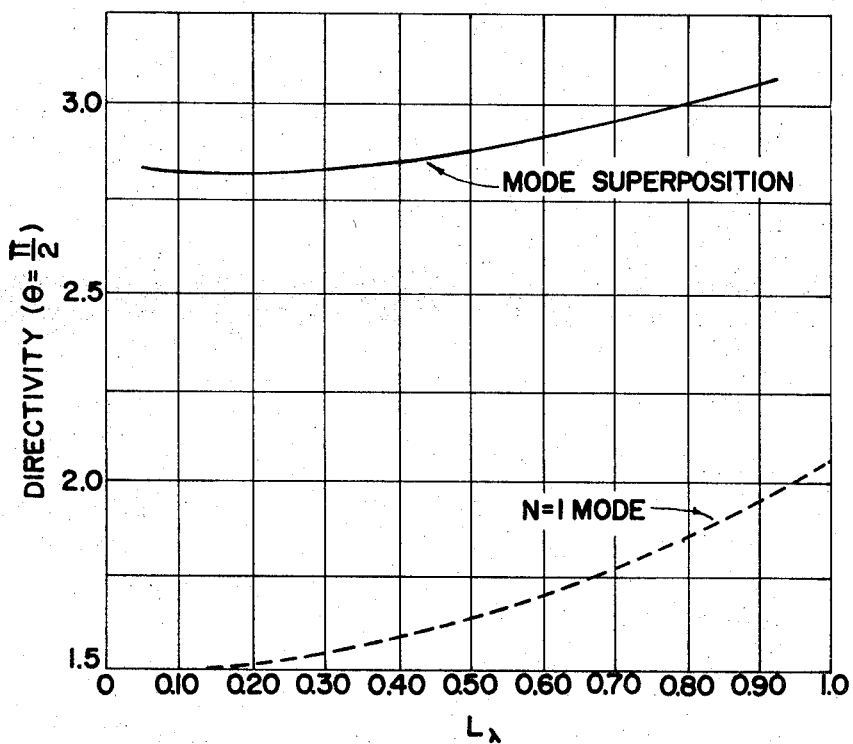
FIG. II

United States Patent Office 3,553,703
Patented Jan. 5, 1971

3,553,703
DUAL-MODE SUPER-DIRECTIVE
SLOT ANTENNA
Carlton H. Walter, Columbus, Ohio, and Anthony G. Jennetti, Lebanon, Pa., assignors to The Ohio State University Research Foundation, Columbus, Ohio
Filed Mar. 14, 1968, Ser. No. 713,032
Int. Cl. H01q 3/76, 13/10
U.S. Cl. 343—767   5 Claims

ABSTRACT OF THE DISCLOSURE

The invention is for super-directive narrow-band slot antennas, with increased directivity accomplished by the excitation and proper combination of multiple modes in dielectric-loaded waveguides.

BACKGROUND

Work done in this area previously has been a general theoretical formulation by C. H. Walter, Traveling Wave Antennas, pp. 115–120, McGraw-Hill, New York, 1965, and some specific cases have been worked out by Ecker for linear mode superposition for half-wavelength aperture, H. A. Ecker, Study of Directivity Optomization for Linear Antennas, Dissertation, Ohio State University, 1965. Ecker did not use a waveguide and did not make his calculations over a bandwidth. Ecker's calculations went up to 9 mode super-position and he found 20° patterns; however, this required betwen 8 and 16 place accuracy, which lacks practicality.

SUMMARY OF THE INVENTION

The invention relates to a super-directive, narrow-band slot antenna in which the first and third order modes are excited. Two embodiments are described herein which provide the desired excitation. One embodiment employs two dielectric-filled waveguides arranged so that the individual apertures are close to each other and radiate as one aperture. One antenna is excited by the $H_{01}$ mode while the other is excited by the $H_{03}$ mode. Provision is made for controlling the mode amplitude ratio through the attenuator adjustment while the relative phasing between the two modes is controlled through the use of a line stretcher. Thus, linear superposition of the two waveguide modes is achieved. The other embodiment provides mode super-position in a single dielectric-filled waveguide slot antenna. Mode synthesis is obtained by adjustment of the position of two feed probes which are inserted in the waveguides. These probes are fed from a single input through use of a coaxial "T."

The slot antennas of the invention produce a 75% increase in directivity over the $H_{01}$ mode as well as a 2:1 reduction in pattern half-power beamwidth over the $H_{01}$ mode. This increased directivity is accomplished over a narrow bandwidth which reduces interference. By changing the phase or amplitude of the two modes "zooming" can be made to occur. A space reduction is achieved by using the antenna of the invention because it would take an array of three antennas to provide equivalent performance. Communications, homing and direction finding are among the uses for the invention.

OBJECTS

Accordingly it is a principal object of the invention to provide an improved slot antenna.

Another object of the invention is to provide a slot antenna with substantially increased directivity when compared to conventional slot antennas.

Another object of the invention is to provide a slot antenna that is super-directive over a narrow bandwidth to reduce interference.

Another object of the invention is to provide a super-directive aperture antenna which permits in a single half-wavelength slot antenna the characteristics of a conventional array of three antennas, thereby resulting in a space reduction.

A further object of the invention is to provide a dual-mode slot antenna capable, in principle, of being electronically controllable for use with an integrated antenna and circuit approach.

Still a further object of the invention is to provide a super-directive antenna which has applications in communications, homing, and direction finding on aircraft.

For a complete understanding of the invention, together with other objects and advantages thereof, reference may be made to the accompanying drawings in which:

BRIEF DESCRIPTION OF THE DRAWINGS

FIG. 1 is a schematic illustration of the physical configuration of the antenna of the preferred embodiment used to achieve mode super-position;

FIG. 1A is another schematic illustration showing the position of the probes relative to the resistance cards of the embodiment of FIG. 1;

FIG. 2 is a graphical representation of the theoretical (FIG. 2A) and measured (FIG. 2B) patterns obtained from the mode super-position antenna illustrated in FIG. 1;

FIG. 3 is a graphical representation of the measured patterns obtained from the antenna illustrated in FIG. 1 when the relative phase between the two modes is changed;

FIG. 5 is an illustration of the physical configuration of an antenna of an alternative embodiment of the invention;

FIG. 5A is a cross sectional view of the embodiment of FIG. 5, specifically illustrating the physical configuration of the probes;

DETAILED DESCRIPTION OF THE DRAWINGS

Figure 4A:
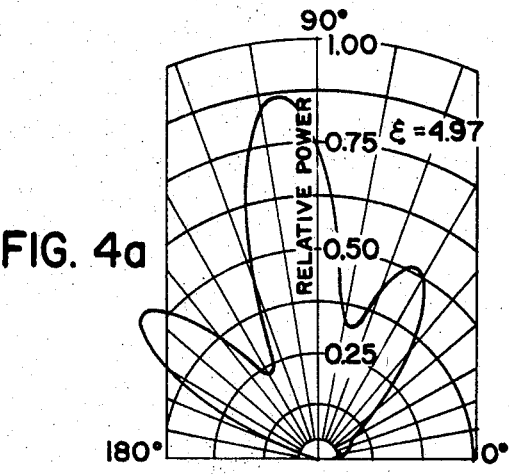
FIG. 4 is a graphical representation of the measured patterns (FIGS. 4A through 4F) obtained from the antenna illustrated in FIG. 1 when the amplitude ratio between the two modes is changed.
Figure 4D:
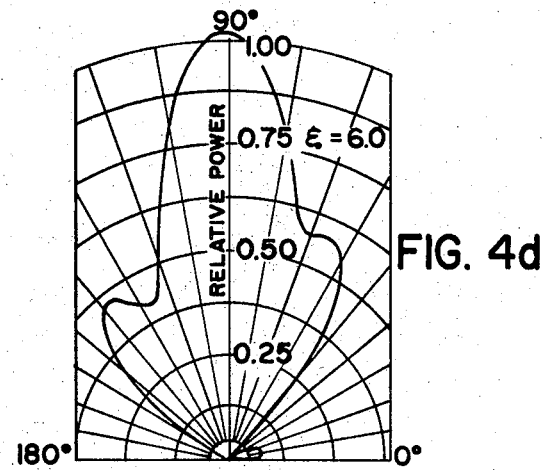
Figure 4B:
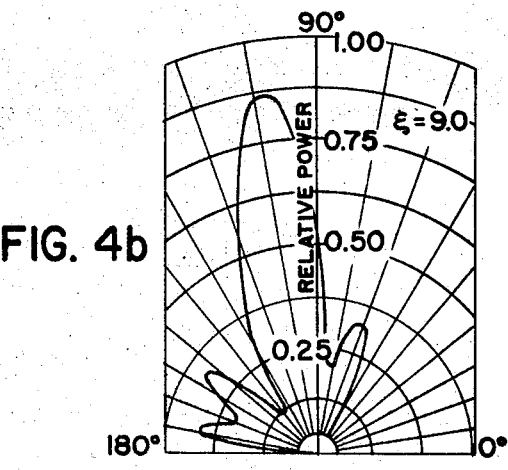
Figure 4E:
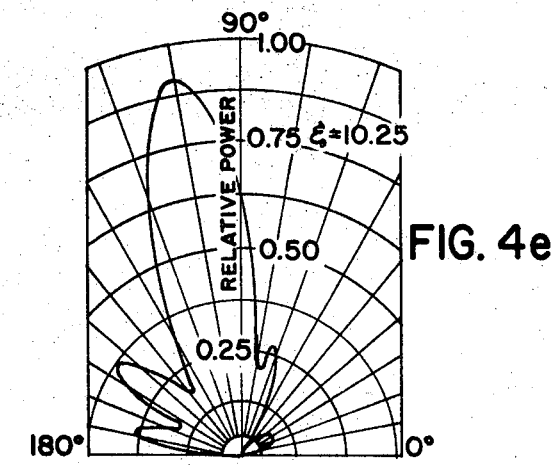
Figure 4C:
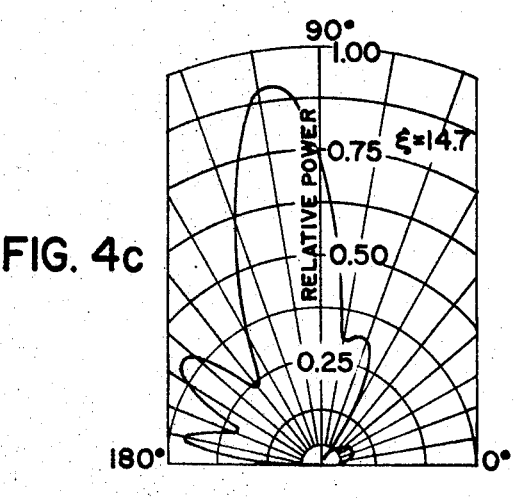
Figure 4F:
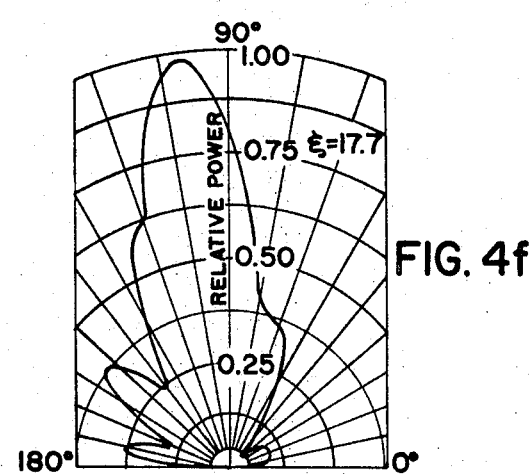
Figure 6A:
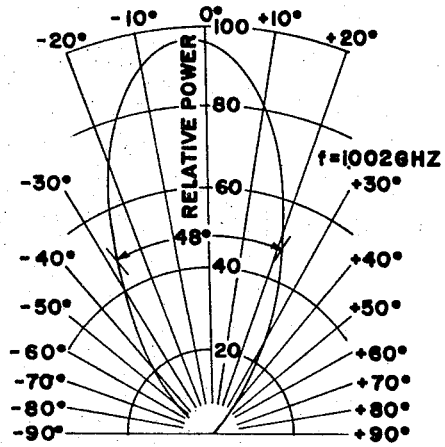
FIG. 6 is a graphical representation of typical patterns obtained from the antenna illustrated in FIG. 5.
Figure 6B:
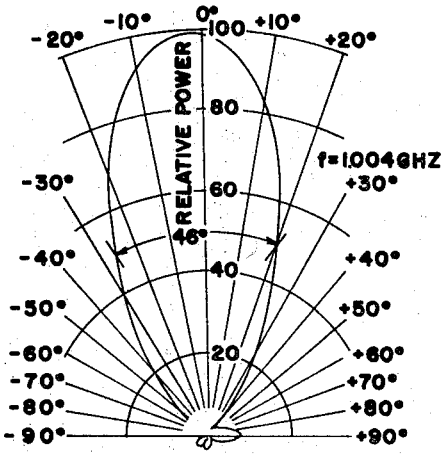
Figure 6C:
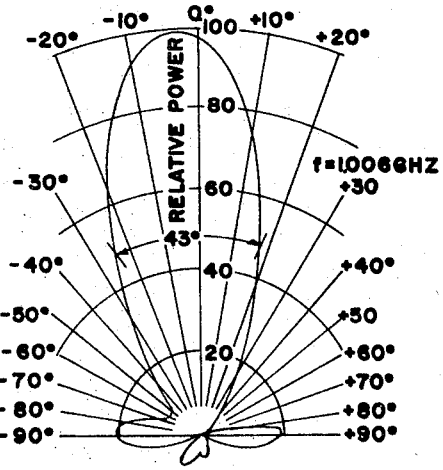
Figure 6D:
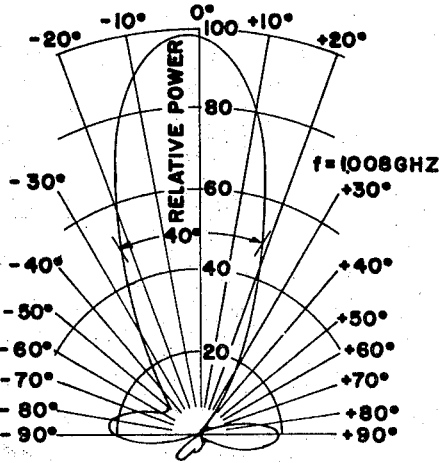

A preferred embodiment of the invention is illustrated in FIG. 1. The antenna consists of two waveguide slot antennas 10 and 20. The cavities of the waveguides are filled with dielectric ($\xi_r = 14$), and the waveguide apertures 15 are spaced closely to approximate a single aperture. The aperture 15 of each antenna has physical dimensions of 15 cm. by 2 cm.

One antenna 10 shown in FIG. 1 is excited by the $H_{01}$ mode. This single lobed mode naturally exists in waveguide and is the dominant mode. The other antenna 20 is excited by the $H_{03}$ mode. This single 3rd order mode excitation is achieved by the attenuation of the $H_{01}$ mode through tapered resistance plates 30 which are placed in the waveguide cavity at the $H_{03}$ zero crossings, which causes attenuation of the $H_{01}$ mode while not affecting the $H_{03}$ mode. The theory of operation of the 3rd order mode slot antenna is disclosed in copending applications, S.N. 713,161, filed Mar. 14, 1968, now Pat. No. 3,550,136.

The antennas are fed from a single source 40 by a coaxial "T" 50 and the mode amplitude ratio of the antennas 15 controlled by adjustment of the attenuators 60 in the individual antenna arms of the coaxial "T" 50. Control of the relative phase between the two modes is accomplished through the use of a line stretcher 70. A line stretcher simply varies the length of the feed of one of the antennas, thereby changing the phase relationship of the two antennas. Electromagnetic coupling to the waveguides 10 and 20 is accomplished by means of coaxial probes 80 inserted into the waveguide cavities.

The result of the above-described configuration is the linear super-position of the two waveguide modes. The experimental patterns to follow were taken at $1.000 \pm 0.002$ gHz. for which the antenna aperture is a free-space half-wavelength long. Patterns that were taken were H-plane patterns.

A comparison between measured and experimental patterns employing mode super-position is given in FIG. 2. From these patterns it is evident that patterns resulting from mode super-position are better than either of the patterns of the individual modes. This is true for both the theoretical and experimental patterns.

Next, patterns are shown for different cases of mode amplitude and phase between the two modes. In the notation to follow $\xi$ will denote the amplitude ratio between the two modes; that is, if the amplitude of the $H_{01}$ mode in the aperture is $A_{01}$ and likewise the $H_{03}$ is $A_{03}$, then $$\xi = A_{03}/A_{01}$$

Also, $\phi$ will be the relative time phase between the two modes at the aperture.

FIG. 3 illustrates some effects on the pattern from changing the phasing, $\phi$, between the modes for the case $\xi = 14.7$. It can also be seen in FIG. 3 that the pattern beamwidth (consequently, the directivity) can be varied by changing $\phi$. This corresponds to "zooming" which occurs in optics. Phase control is not critical with mode super-position; that is, there is a wide relative time phase range over which patterns better than either of the individual mode patterns can be obtained.

FIG. 4 illustrates the opposite case; that is $$\phi = \text{constant} = 180°$$

and the mode amplitude ratio, $\xi$, is varied. Zooming also occurs in this case as illustrated in FIG. 4. All the patterns in FIG. 4 have a narrower half-power beamwidth than the corresponding patterns of either the $H_{01}$ or $H_{03}$ mode. This indicates that amplitude control also is not critical with mode super-position.

An alternative embodiment of the invention is illustrated in FIG. 5. The antenna consists of a waveguide slot antenna 85. The waveguide cavity is filled with dielectric ($\xi_r = 14$) material. The waveguide aperture 87 has the physical dimensions of 15 cm. by 2 cm. and is coplanar with and securely attached to a ground plane 90. The antenna 85 is fed from a single input 100 through a coaxial "T" 110 which supplies the signal to two probes 120 inserted in the waveguide 85. The cables 130 between the coaxial "T" 110 and the two probes 120 are the same exact length. This maintains the phase relationship between the two feeds 120. Mode amplitude synthesis is obtained through adjustment of the position of the feed probes 120. The feed probes 120 are moved by means of feed screw 81 in a plane parallel to the waveguide aperture 87 and are maintained in a symmetrical relationship to the longitudinal center-line of the waveguide 85. Representative patterns are presented in FIG. 6 where the measured half-power beamwidth is 40°. This antenna is narrow-band (approximately 1 percent) and provides at 75% increase in directivity. The principle of reciprocity, when applied to the antennas of the invention, states that the receiving and transmitting patterns of the antennas are the same.

The following analysis provides a complete understanding of the theory underlying the operation of the antennas disclosed herein.

Figure 7:
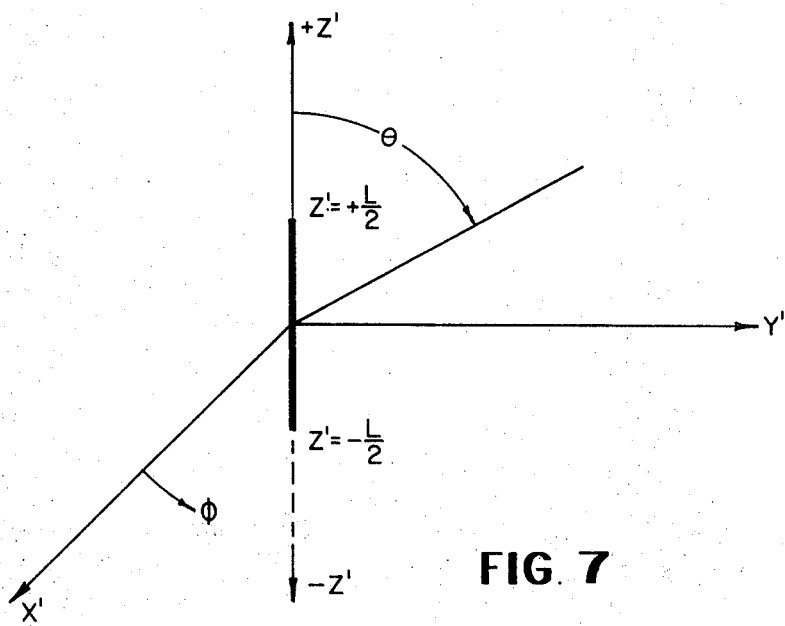
FIG. 7 is a graphical representation of the coordinate system of the line source antenna which is used for discussion of mode superposition in the theory of the invention.

For the sake of simplicity, in analyzing the super-position of the $H_{01}$ and $H_{03}$ modes, we will consider the antenna to be a line source length $L_\lambda = L/\lambda$ located along the $z$ axis, centered at an origin ($z' = 0$) as illustrated in FIG. 7. An aperture distribution, $A(z')$, exists along the structure and is given by:

(1) $$A(z') = \cos\frac{\pi z'}{L} + \xi \cos\left(\frac{3\pi z'}{L}\right)$$

The far-field pattern, $F(k \cos \theta)$, of Eq. 1 is uniform in the plane perpendicular to the line source and is given in general by (2)
$$F(k \cos \theta) = \sin \theta \cos (\pi L_\lambda \cos \theta)$$
$$\times \left\{ \frac{1}{\frac{1}{4L_\lambda^2} - \cos^2 \theta} - \frac{3\xi}{\frac{9}{4L_\lambda^2} - \cos^2 \theta} \right\}$$

where $\theta = \pi/2$ is taken to be the broadside direction to the line source and $\xi$, the mode amplitude ratio, is taken to be a real number. From Eq. 2, we see that the far-field pattern is the sum of two pattern functions and thus that the shape (and also amplitude) of the pattern can be controlled by varying $\xi$.

Figure 8A:
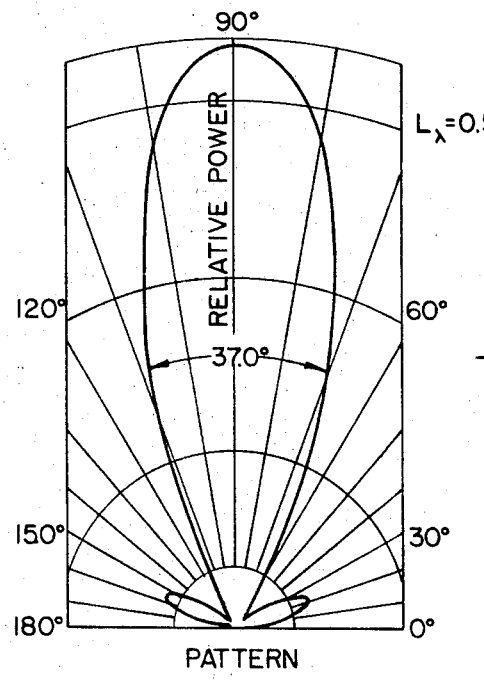
FIG. 8 is a graphical representation of the calculated pattern (FIG. 8A) and corresponding aperture distribution (FIG. 8B) obtainable from a half-wavelength aperture of the line source antenna illustrated in FIG. 7.
Figure 8B:
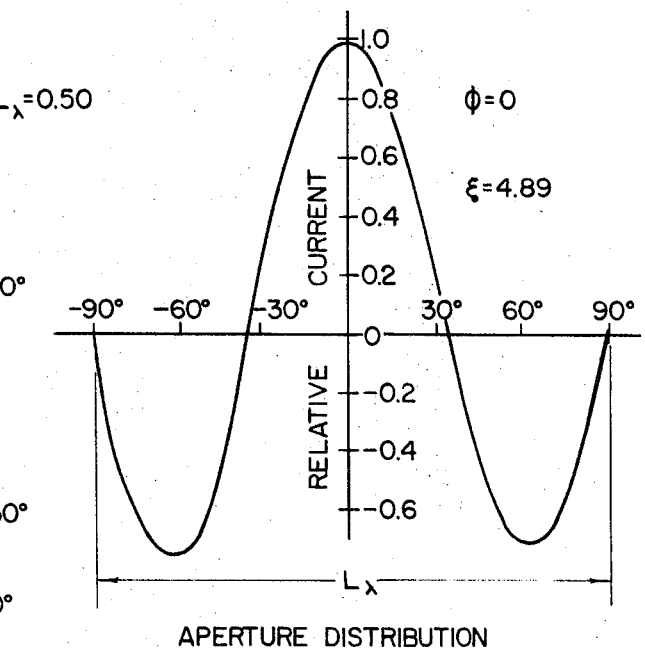

There exists a maximum value of directivity, $D_{max}$, and for this there is a corresponding value of $\xi$, denoted hereafter as $\xi_{D_{max}}$. FIG. 8 illustrates the pattern along with the corresponding aperture distribution, with the constraint of maximum directivity, for which $\xi = \xi_{D_{max}}$. The resulting pattern has a half-power beamwidth (HPBW) of 37°, which is approximately half that of a conventional cosine-illuminated slot antenna (HPBW = 78°)

Figure 9A:
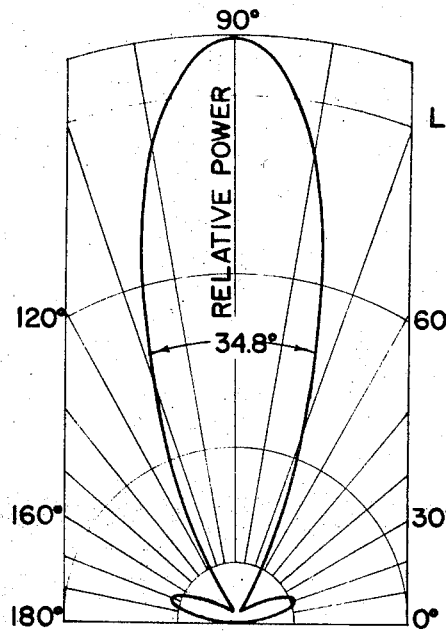
FIG. 9 is a graphical representation of the calculated pattern (FIG. 9A) and corresponding aperture distribution (FIG. 9B) obtainable from a one-wavelength aperture of the line source antenna illustrated in FIG. 7.
Figure 9B:
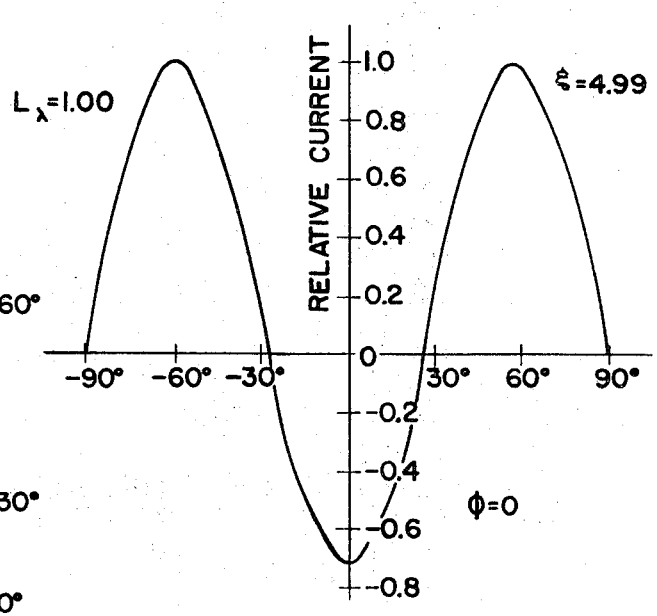
Figure 10:
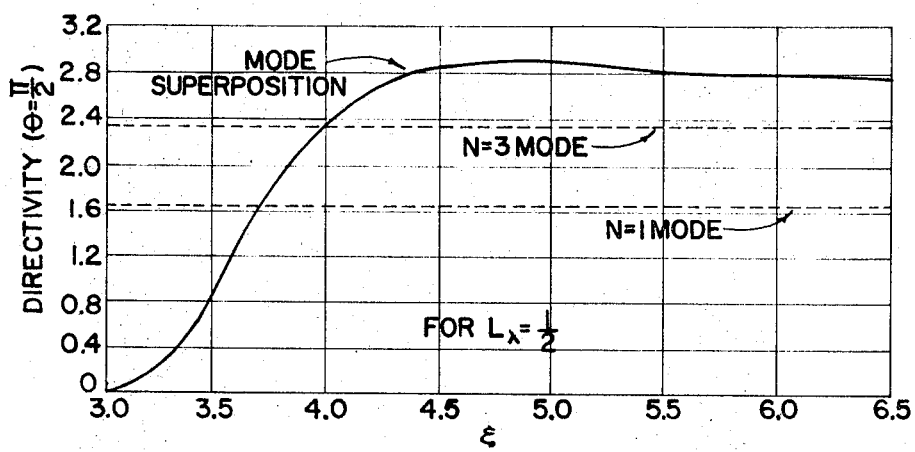
FIG. 10 is a graphical representation of the calculated directivity plotted as a function of the mode amplitude ratio to show pattern control capabilities of the mode superposition antenna illustrated in FIG. 7; and, FIG. 11 is a graphical representation of the calculated maximum broadside directivity as a function of aperture length of the line source antenna illustrated in FIG. 7.

Pattern data and aperture distribution were calculated over a range of electrical aperture lengths ranging from $0.10\lambda$ to $1.00\lambda$. A typical pattern, and its corresponding aperture distribution for the constraint of maximum directivity, is illustrated in FIG. 9 for a one-wavelength aperture. This pattern closely resembles the pattern of FIG. 8. This could be predicted from the relatively constant directivity that resulted when a numerical plot of directivity vs. $\xi$ was obtained for the case $L_\lambda = \frac{1}{2}$, as illustrated in FIG. 10. The maximum directivity occurs at $\xi = 4.9$, and as can be seen $\xi$ can vary over a wide range of values while the directivity undergoes little degradation.

Using the above result for $_{Dmax}$ the maximum broadside directivity as a function of aperture length was calculated and is illustrated in FIG. 11. The directivity for the dominant (N=1) mode is presented for comparison. As can be seen from FIG. 1 the directivity does not change substantially over the range of points considered, and also fairly large directivity values are promised even at small aperture dimensions. For example, at $L_\lambda = \frac{1}{4}$, the directivity obtainable as about 2.83, whereas for single-mode excitation it is only 1.55.

Although certain and specific embodiments have been illustrated, it is to be understood that modifications may

What is claimed is:

1. A super-directive narrow-band slot antenna comprising a pair of dielectric-filled waveguides positioned one over the other, the said waveguides having substantially equal exterior dimensions and aperture size; one of said waveguides further comprising tapered resistance plates positioned within said waveguide at the two zero-crossings of the $H_{03}$ rectangular waveguide mode, means for coupling electromagnetic energy to said waveguides, said coupling means comprising a single input into a coaxial "T," at least one probe in each of said waveguides positioned along the longitudinal center lines thereof, and means for connecting the arms of said coaxial "T" to said probes.

2. An antenna as set forth in claim 1 wherein said coupling means further comprises an attenuator in each of the said arms wherein the waveguides' mode amplitude ratio may be controlled, thereby permitting zooming of the antenna pattern.

3. An antenna as set forth in claim 1 wherein said coupling means further comprises a line stretcher in one of the arms wherein the relative phase of the two waveguide modes may be controlled, thereby permitting zooming of the antenna pattern.

4. An antenna as set forth in claim 1 wherein said coupling means further comprises an attenuator in each of the said arms wherein the waveguides' mode amplitude ratio may be controlled, and a line stretcher in one of the arms wherein the relative phase of the two waveguide modes may be controlled, thereby permitting zooming of the antenna pattern.

5. A super-directive narrow-band slot antenna comprising a dielectric-loaded rectangular waveguide, a ground plane, means for securely attaching said waveguide with the longitudinal axis thereof at right angles to said ground plane, the aperture of said waveguide positioned at the ground plane end of said waveguide, said ground plane having a discontinuity, said aperture coplanar with said ground plane in said discontinuity to permit free radiation; means for coupling electromagnetic energy to said waveguide, said coupling means comprising a single input into a coaxial "T," the arms of said coaxial "T" of substantially equal length, a pair of probes inserted into said waveguide, means for connecting the arms of said coaxial "T" to said probes, and means for adjusting the position of said probes symmetrically about the longitudinal center line of the waveguide and in a plane perpendicular to said center line.

References Cited

UNITED STATES PATENTS

| | | | |
|---|---|---|---|
| 2,548,655 | 4/1951 | Cutler | 333—21X |
| 2,617,937 | 11/1952 | Van Atta | 333—21X |
| 2,684,469 | 7/1954 | Senisper | 333—98(M) |
| 2,963,701 | 12/1960 | Hagaman | 343—777X |
| 2,994,869 | 8/1961 | Woodyard | 343—777X |
| 3,259,902 | 7/1966 | Malech | 343—777 X |
| 3,286,202 | 11/1966 | Daveau | 333—98X |
| 3,308,469 | 3/1967 | Drabowitch | 343—778 |

FOREIGN PATENTS

| | | | |
|---|---|---|---|
| 523,800 | 4/1956 | Canada | 333—98M |

HERMAN KARL SAALBACH, Primary Examiner

W. H. PUNTER, Assistant Examiner

U.S. Cl. X.R.

343—777, 778, 783, 848, 854; 333—98